(No Model.)

C. P. RUSSELL.
COMBINED DRILL AND COUNTERSINK.

No. 303,053. Patented Aug. 5, 1884.

Attest:
F. W. Howard
Edw. H. Downs

Inventor;
Charles P. Russell
By C. S. Whitman
Atty.

United States Patent Office.

CHARLES P. RUSSELL, OF GREENFIELD, MASSACHUSETTS, ASSIGNOR TO THE WILEY & RUSSELL MANUFACTURING COMPANY, OF MASSACHUSETTS.

COMBINED DRILL AND COUNTERSINK.

SPECIFICATION forming part of Letters Patent No. 303,053, dated August 5, 1884.

Application filed January 2, 1884. (No model.)

*To all whom it may concern:*

Be it known that I, CHARLES P. RUSSELL, a citizen of the United States, residing at Greenfield, in the county of Franklin and State of Massachusetts, have invented certain new and useful Improvements in a Combined Drill and Countersink; and I do hereby declare the following to be a full, clear, and exact description of the invention, such as will enable others skilled in the art to which it appertains to make and use the same.

My invention relates to that class of drills which are made use of for boring holes in metal or hard substances; and the nature thereof consists in combining with the drill a conical cutter of peculiar construction for chamfering the edge of the hole cut by the drill, and thus forming a countersink or enlargement to receive the head of a screw or bolt. The points of the conical cutter or countersink reach below the cutting-line of the drill, and are formed in such a manner that though the drill may be passed it will not readily turn. The steel which lies in the fluting of the drill and within the circle cut by it adds strength to the countersink, prevents its breaking, and insures cutting a perfect hole.

Figure 1:
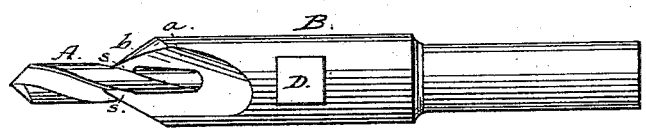
Figure 2:
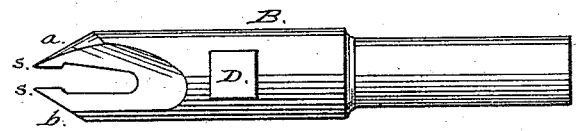

In the accompanying drawings, Figure 1 represents the countersink-drill with the parts thereof combined and ready for use. Fig. 2 illustrates the countersink detached from the drill.

A designates a twist-drill of the usual form, and B is a hollow cylinder having one of its ends chamfered or beveled to a proper angle. This chamfered or beveled edge is formed by turning a conical surface, *b*, and filing upon it depressions *a* in such a manner as to form cutters for chamfering or enlarging the hole cut by the drill. These cutters are provided with projections or teeth *s*, which fit within the spiral grooves or flutings of the drill in such a manner as to permit it to pass freely through the bore of the cylinder, and yet prevent it from turning or twisting. By this construction a tool is provided in which means are supplied for lengthening and shortening the inner or drilling bit, strengthening the cutting-point of the countersink, and preventing the drill from being turned.

The boring implement illustrated in the drawings is a twist-drill; but other drills may be used, if preferred. The cylinder upon which the chamfer-cutters or countersink is formed is provided with a hole or bore extending entirely through it from end to end, in order that a drill of any length can be passed through, and that the drill may be pushed back or drawn within the cylinder to allow of the cutting-edges of the countersink being ground.

A tool of the construction described is particularly applicable to the operation of securing the tire to a carriage-wheel, although of course it may be used for many purposes. When used for this purpose, it is placed in a proper holder or machine, and rotated in such a manner that the drill passes through the tire and fellies, while the cutting-edges of the hollow cylinder chamfer and enlarge the hole cut by the drill, and form a countersink or enlargement of the hole to receive the head of the tire or countersink headed bolt. The drill is secured to the cylinder, and relatively adjusted thereto by means of the set-screw D, which, on being turned down, holds the drill in any desired position, and so that its end may be at any desired distance from the countersink.

Having thus described my invention, I claim and desire to secure by Letters Patent—

The combination of the twist-drill A, the set-screw D, and the cylinder B, having a bore extending entirely through it, and provided with cutters having inwardly-projecting teeth *s*, which fit within the spiral grooves of the drill in such a manner as to permit it to pass freely through the bore of the cylinder, and yet prevent it from turning, as and for the purposes described.

In testimony whereof I affix my signature in presence of two witnesses.

CHARLES P. RUSSELL.

Witnesses:
JOHN PUTNAM,
WILLIAM S. WILLIAMS.